(12) United States Patent
Wu

(10) Patent No.: US 12,538,937 B2
(45) Date of Patent: Feb. 3, 2026

(54) SEA BUCKTHORN-CITRUS COMPOUND PREBIOTICS MEAL REPLACEMENT BAR

(71) Applicant: Zhejiang University, Hangzhou (CN)

(72) Inventor: Dan Wu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 395 days.

(21) Appl. No.: 18/309,846

(22) Filed: May 1, 2023

(65) Prior Publication Data

US 2023/0380472 A1 Nov. 30, 2023

(30) Foreign Application Priority Data

May 24, 2022 (CN) .......................... 202210568839.X

(51) Int. Cl.
| | |
|---|---|
| A23L 33/105 | (2016.01) |
| A23L 5/10 | (2016.01) |
| A23L 5/20 | (2016.01) |
| A23L 33/00 | (2016.01) |
| A23L 33/135 | (2016.01) |

(52) U.S. Cl.
CPC ............... A23L 33/40 (2016.08); A23L 5/15 (2016.08); A23L 5/28 (2016.08); A23L 33/105 (2016.08); A23L 33/135 (2016.08)

(58) Field of Classification Search
CPC ... A23V 2200/30; A23L 33/105; A23L 2/382; A23L 29/00; A23L 33/40; A23L 33/135; A23L 5/00
USPC ... 426/631, 62, 656, 558, 443, 439, 725, 93; 424/93.45
See application file for complete search history.

(56) References Cited

U.S. PATENT DOCUMENTS

2014/0212453 A1* 7/2014 Chang ..................... A23L 11/05
426/94

FOREIGN PATENT DOCUMENTS

CN 1057171 A * 12/1991

OTHER PUBLICATIONS

Chen, Kang, Fangfei Zhou, Jian Zhang, Pin Li, Yumei Zhang and Baoru Yang, "Dietary Supplementation with Sea Buckthorn Berry Puree Alters Plasma Metabolomic Profile and Gut Microbiota Composition in Hypercholesterolemia Population", Foods 2022, 11, 2481, pp. 1-16 (Year: 2022).*
Guo, Rui-Xiao, CN 1057171 A, Machine Translation English, Dec. 25, 1991 (Year: 1991).*

* cited by examiner

*Primary Examiner* — Hong T Yoo
(74) *Attorney, Agent, or Firm* — Cooper Legal Group, LLC

(57) ABSTRACT

Disclosed is a sea buckthorn-citrus compound prebiotics meal replacement bar, belonging to the technical field of food. The raw materials include, in parts by weight, 5 parts of protein powder, 3 parts of oats, 3 parts of chopped walnuts, 1.5-2 parts of citrus compound prebiotics, 3-4 parts of cocoa powder, 4-6 parts of sea buckthorn ferment powder, 5 parts of white sugar, 3 parts of chopped peanuts and 15-20 parts of egg white; it is obtained by steps of: mixing protein powder, oats, chopped walnut, citrus compound prebiotics, cocoa powder, white sugar, chopped peanut and sea buckthorn ferment powder, adding egg white, immediately stirring to obtain meal replacement bar pulp, and baking.

9 Claims, 4 Drawing Sheets

SEA BUCKTHORN-CITRUS COMPOUND PREBIOTICS MEAL REPLACEMENT BAR

CROSS-REFERENCE TO RELATED APPLICATIONS

This application claims priority to Chinese Patent Application No. 202210568839X, filed on May 24, 2022, the contents of which are hereby incorporated by reference.

TECHNICAL FIELD

The present application belongs to the technical field of food, and in particular to a sea buckthorn-citrus compound prebiotics meal replacement bar.

BACKGROUND

Protein bars are a type of food containing a high proportion of protein first introduced in the 1980s and are widely accepted in the fields of military, aerospace, rescue and others with special needs for food, as well as in the area of functional foods such as sports and fitness. They are universally preferred for their portability, easy consumption, lightness and good functions. In recent years, consumer demands for protein-enhanced products and convenience foods are fueled to a great extent as a result of the growing awareness of body-building exercise and health in the context of a contemporary busy lifestyle.

It is reported that around one billion people worldwide are in a sub-healthy state, and with the concept of healthy living so different from the fast-paced lifestyle, a growing number of people are looking for solutions to the issue of uneven nutrition despite the wide variety of food available. The concept of superfood was first introduced in 1980 by American dieticians, who defined it as natural food that are nutritionally superior and comprehensive, low in calories and good for health, which is similar to the ancient Chinese concept of medicine and food from the same source. Superfood is highlighted by two key features: (1) high nutrient densities, allowing average persons to consume nutrients quickly even when they are busy; and (2) rich in antioxidant ingredients, such as saturated fatty acids, vitamin C, polyphenols and no cholesterol, which help to effectively improve the overall health of the working population that have been suffering from irregular work pattern and lack of exercise for a long time.

Sea buckthorn is one of the popular and ideal superfoods. As it is found in modern research that sea buckthorn contains more than 190 active ingredients in 12 categories, including up to 36 flavonoids and phenols, 22 fatty acids, 42 lipids, 8 amino acids, 11 trace elements, dozens of triterpenes and steroids and phospholipids, 5-hydroxytryptamine and sugars, in addition to alkaloids, coumarins and minerals; moreover, it is rich in 15 vitamins including vitamin C, vitamin A, vitamin E, vitamin B1, B2, B12, vitamin K and folic acid (vitamin B9). Sea buckthorn is also currently the world's most valuable economic forest species containing the most types of natural vitamins, with a much higher vitamin C content than fresh dates and kiwifruit, making it a renowned source of natural vitamins.

However, sea buckthorn has always been little known to people for the reasons of: 1) geographical restrictions, as sea buckthorn is mainly distributed in the arid and semi-arid northwest of China, where the growing areas are subject to limited transportation, economic underdevelopment and limited development capacity; 2) small and soft skinned sea buckthorn berries, which are subject to considerable loss in harvesting and transportation, as well as seasonal restrictions on sea buckthorn production, resulting in an unbalanced fruit supply; 3) sour taste of ripe sea buckthorn berries instead of sweetness, which is not very acceptable to the general public. Therefore, an ideal superfood like sea buckthorn can be used in the preparation of portable, convenient, light and functional food products such as protein bars, which will not only improve the exploitation of sea buckthorn, but also significantly increase the nutritional value of protein bars.

SUMMARY

In order to solve the above problems in the prior art, the present application provides a sea buckthorn-citrus compound prebiotics meal replacement bar.

In order to achieve the above objectives, the present application provides the following technical schemes:

a sea buckthorn-citrus compound prebiotics meal replacement bar, including raw materials in parts by weight as follows: 5 parts of protein powder, 3 parts of oats, 3 parts of chopped walnuts, 1.5-2 parts of citrus compound prebiotics, 3-4 parts of cocoa powder, 4-6 parts of sea buckthorn ferment powder, 5 parts of white sugar, 3 parts of chopped peanuts and 15-20 parts of egg white.

Optionally, the raw materials include, in parts by weight, 5 parts of protein powder, 3 parts of oats, 3 parts of chopped walnuts, 2 parts of citrus compound prebiotics, 4 parts of cocoa powder, 4 parts of sea buckthorn ferment powder, 5 parts of white sugar, 3 parts of chopped peanuts and 20 parts of egg white.

Optionally, the citrus compound prebiotics are prepared by a preparation method as follows: using citrus canning processing alkaline water as a material, filtering and adjusting pH to 5-7, then performing ultrafiltering to obtain a concentrated solution of pectin polysaccharide, followed by alcohol precipitation using 60 percent (%) ethanol, oven-drying at 45 degrees Celsius (° C.) and pulverizing to obtain a product 1; using citrus canning processing acidic water as a material, adjusting pH to 3.5-7, performing filtering then ultrafiltering to obtain a concentrated solution of pectin polysaccharide, followed by alcohol precipitation using 60% ethanol, oven-drying at 45° C. and pulverizing to obtain a product 2; and mixing the product 1 and the product 2 according to a mass ratio of 1:1 to obtain the citrus compound prebiotics.

Optionally, the sea buckthorn ferment powder is prepared by a preparation method as follows: preparing fresh sea buckthorn fruit into pulp, then adding yeast and *Lactobacillus casei* for fermentation, obtaining a fermentation product, and drying and crushing the fermentation product to obtain the sea buckthorn ferment powder.

Optionally, a feed-water ratio is adjusted to 1:1 (sea buckthorn fruit in a mass ratio of 1:1 to water), and a sugar content is adjusted to 10% before fermentation.

Optionally, the yeast is added in an amount of 0.1-0.2% of a mass of the sea buckthorn fruit.

Optionally, the *Lactobacillus casei* is added in an amount of 0.4-0.6% of the mass of the sea buckthorn fruit.

Optionally, the fermentation is carried out under a temperature of 35-40° C. for a duration of 12-48 hours (h).

The present application also provides a preparation method of the sea buckthorn-citrus compound prebiotics meal replacement bar, including steps as follows: mixing protein powder, oats, chopped walnuts, citrus compound prebiotics, cocoa powder, white sugar, chopped peanuts and sea buckthorn ferment powder, adding egg white, immediately stirring to obtain a meal replacement bar primary pulp, and baking to obtain the sea buckthorn-citrus compound prebiotics meal replacement bar.

Optionally, the baking is carried out under a temperature of 170-190° C. for a duration of 20-30 minutes (min).

Compared with the prior art, the present application has the following beneficial effects:

the total phenolic content of the sea buckthorn ferment powder of the present application is increased by 1.3-2.0 times through the fermentation process, while the tea polyphenol content in sea buckthorn is increased by 2-4 times, which is the first of its kind as there are no relevant reports of effective methods to increase the sea buckthorn tea polyphenols;

in terms of preparing the sea buckthorn-citrus compound prebiotic product of the present application, the purification step of alcohol precipitation is included on the basis of the prior art so as to obtain a compound prebiotic product with higher purity, and the compound prebiotic product obtained through the 1:1 compounding of acidic water-based pectin and alkaline water-based pectin has a larger molecular weight ranging from 17 kilodaltons (kD) to 972 kD, with a more reasonable side chain monosaccharide grouping ratio and possessing more physiological activities, where galactose and arabinose account for more than 20-50%, xylose, galactose and glucose account for more than 10-20%, and mannose, rhamnose and fucose account for more than 1-5%;

by adding sea buckthorn ferment powder to the meal replacement bar, the present application conforms to the quality requirements of meal replacement protein bars with a longer shelf life, while the sour taste of sea buckthorn fruit powder is well balanced by incorporating auxiliary ingredients such as oatmeal chocolate;

the organic combination of sea buckthorn and protein meal replacement bars improves the nutritional value of protein meal replacement bars and addresses the needs of the market and consumers; by studying the feasibility of combining sea buckthorn with protein bars, the present application provides a meal replacement bar that is both stomach-filling and tasty, offering the public more options for meal replacements and introducing a new concept of healthy and light food; and the meal replacement bar prepared by the present application features a long shelf life at a room temperature (while the chocolate protein bars available on the market melts at temperatures above 36° C. and require low temperature storage); by incorporating sea buckthorn and citrus compound probiotics into the meal replacement bar according to a reasonable ratio, the meal replacement bar therefore achieves high nutritional value and provides antioxidant physiological activity; besides, it also has the effect of improving the intestinal mucous membrane barrier, increasing the number of specific intestinal flora such as *Lactobacillus, Bifidobacterium* and *Erysipelothrix*, and reducing the number of the *Bacteroides* during its digestion, as well as the effect of reducing high blood lipids, high blood pressure and high blood sugar.

BRIEF DESCRIPTION OF THE DRAWINGS

For a clearer illustration of the technical schemes in the embodiments of the present application or in the prior art, a brief description of the accompanying drawings to be used in the embodiments is given below. It is obvious that the accompanying drawings in the following description are only some of the embodiments of the present application and that other accompanying drawings are available to those of ordinary skill in the art without any creative effort.

DETAILED DESCRIPTION OF THE EMBODIMENTS

A number of exemplary embodiments of the present application are now described in detail, and this detailed description should not be considered as a limitation of the present application, but should be understood as a rather detailed description of certain aspects, characteristics and embodiments of the present application. It should be understood that the terminology described in the present application is only for describing specific embodiments and is not used to limit the present application.

In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges can be independently included or excluded from the range.

Unless otherwise specified, all technical and scientific terms used herein have the same meaning as commonly understood by one of ordinary skill in the art to which this present application relates. Although the present application only describes the preferred methods and materials, any methods and materials similar or equivalent to those described herein can also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present application without departing from the scope or spirit of the present application. Other embodiments will be apparent to the skilled person from the description of the present application. The description and example of that present application are exemplary only.

The terms "including", "comprising", "having" and "containing" used in this description are all open terms, which means including but not limited to.

In the following embodiments, the dry yeast is purchased from Guangdong Tianyi Biotechnology Co., Ltd. of Zhenjiang, China, and the *Lactobacillus casei* is purchased from Shanghai Yuanye Bio-Technology Co., Ltd.

Embodiment 1

Figure 2:
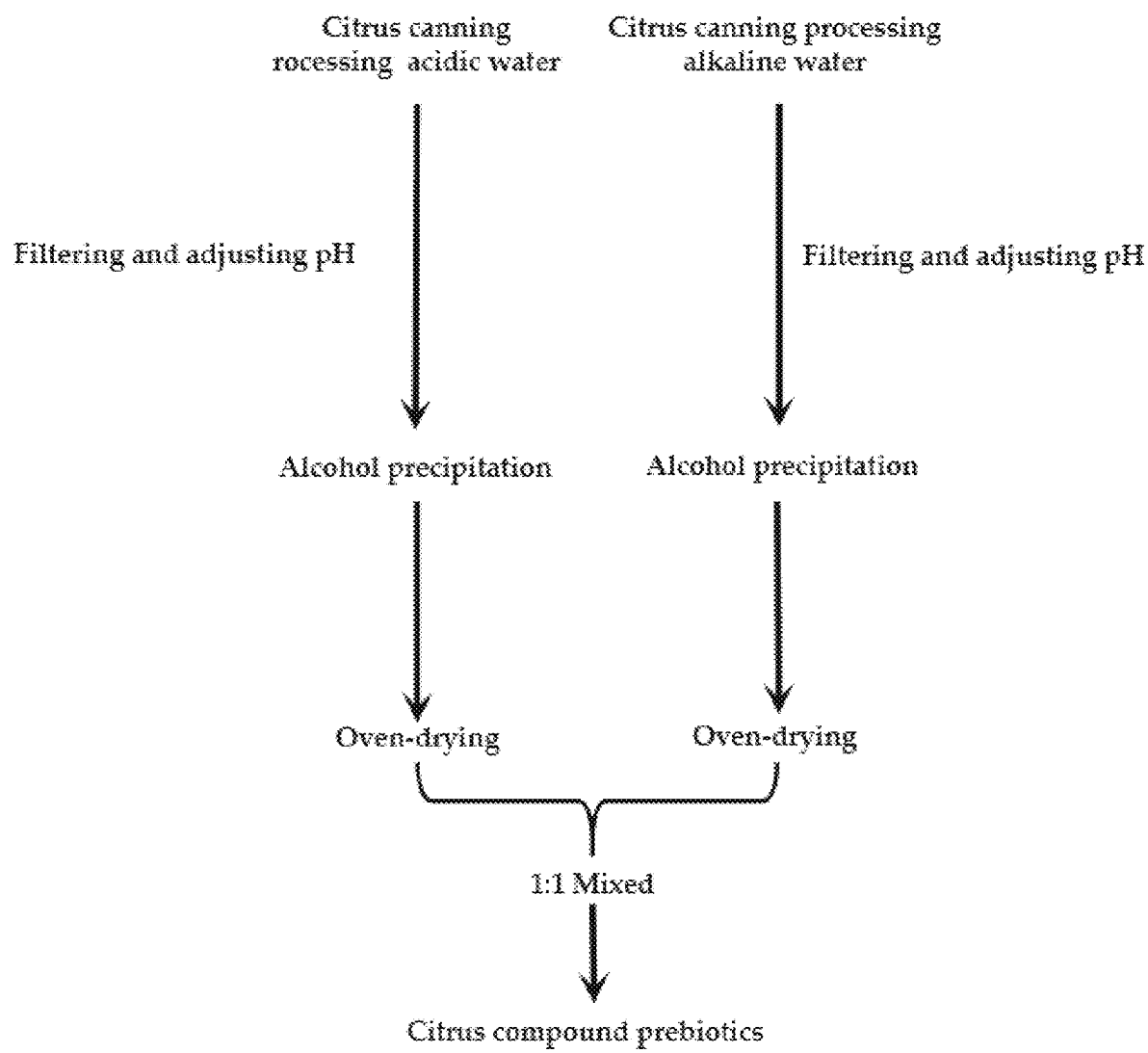
FIG. 2 illustrates a process of preparing citrus compound prebiotics according to an embodiment of the present application.

As shown in FIG. 2, a preparation method of citrus compound prebiotics includes the following steps:
(1) taking citrus canning processing alkaline water as a material, filtering using a sieve with a mesh of 200 meshes to obtain a filtrate, stirring the filtrate while adding hydrochloric acid solution to make the pH of the filtrate be 6, then passing the filtrate sequentially through a first ultrafiltration device and a second ultrafiltration device, where the first ultrafiltration device has a membrane interception molecular weight of 100,000, and the second ultrafiltration device has a membrane interception molecular weight of 5,000; obtaining a concentrated solution of pectin polysaccharide, followed by alcohol precipitation using 60 percent (%) ethanol, oven-drying at 45 degree Celsius (° C.) and pulverizing to obtain a beige powder product of pectin polysaccharide powder;
(2) using citrus canning processing acidic water as a material, stirring the water while adding 6.5 mole per liter (mol/L) NaOH solution to adjust the pH of the acid water to 5.5, then filtering through a 100-mesh bag filter, then passing through an ultrafiltration device with a ultrafiltration membrane of interception molecular weight of 400,000; obtaining a concentrated solution of pectin polysaccharide, followed by alcohol precipitation using 60% ethanol, oven-drying at 45° C. and pulverizing to obtain a white powder product of pectin polysaccharide powder;
(3) mixing the pectin polysaccharide powder obtained in the step (1) and the pectin polysaccharide powder obtained in the step (2) in a mass ratio of 1:1 to obtain citrus compound prebiotics; the citrus compound prebiotics include pectins of different molecular weights, ranging from 17 kilodalton (kD) to 972 kD; the citrus compound prebiotics are analyzed to have the main components in the following ratios: galacturonic acid and arabinose in a range of 20-50%, xylose, galactose and glucose in a range of 10-20%, and mannose, rhamnose and rock candy in a range of 1-5%.

In this embodiment, the preparation process of pectin polysaccharide powder includes a purification operation of alcohol precipitation, therefore obtaining a less lower content of impurities (such as sodium chloride, etc.) in the obtained product; the pectin polysaccharides contained in the citrus compound prebiotics prepared by this embodiment have a large molecular weight range and more side chain monosaccharides compared to commercially available pectin polysaccharides, and possess more physiological activities, including the effectiveness of relaxing bowels and improving the intestinal mucosal barrier, increasing the number of specific intestinal flora such as *Lactobacillus*, *Bifidobacterium* and *Erysipelothrix*, and reducing the number of the *Bacteroides*, as well as the effect of reducing high blood lipids, high blood pressure and high blood sugar; meal replacement bars containing cocoa powder and citrus compound prebiotics are effective in moderating the rise of blood glucose in both healthy people and people with impaired glucose tolerance, as well as facilitating the recovery of blood glucose among people with impaired glucose tolerance.

Embodiment 2

Figure 3:
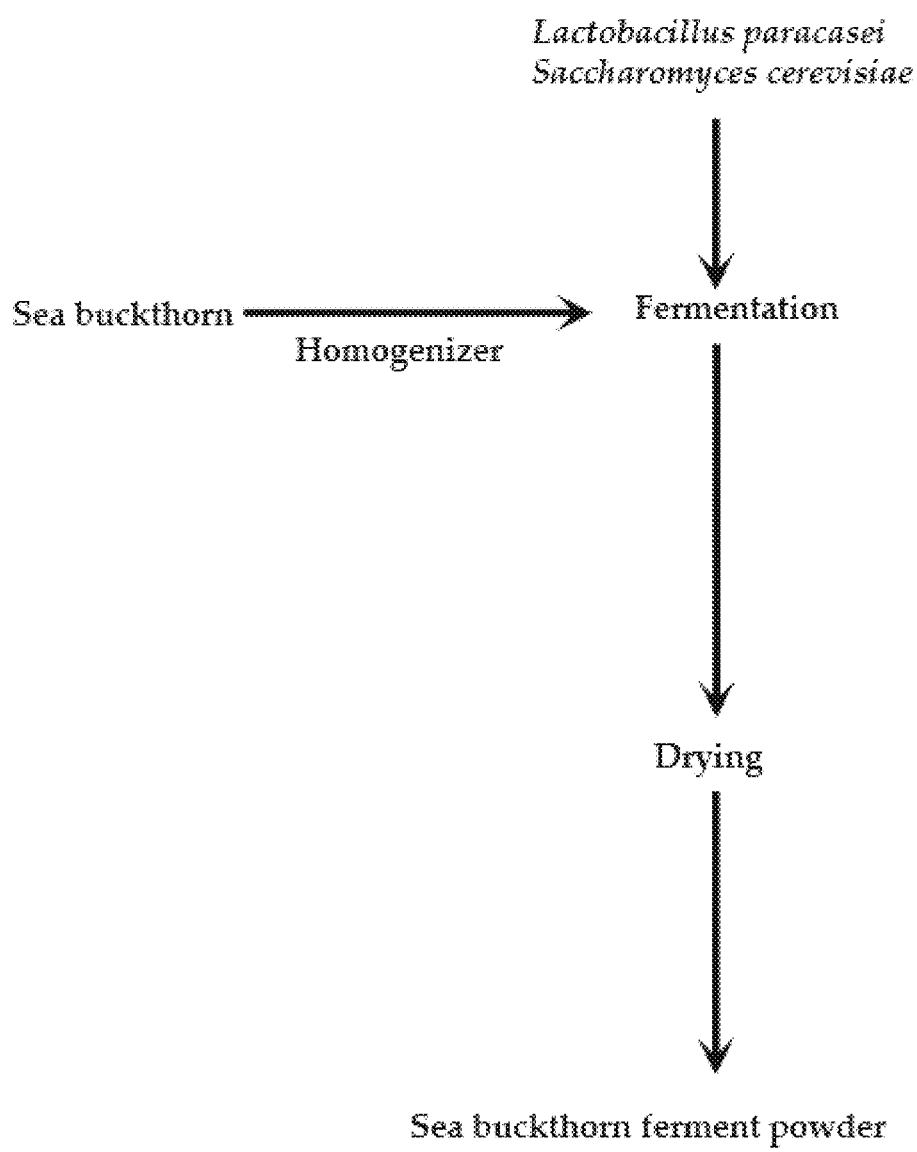
FIG. 3 shows a process of preparing of sea buckthorn ferment powder according to an embodiment of the present application.

Referring to FIG. 3, a preparation method of sea buckthorn ferment powder includes the following steps:
washing 500 grams (g) of sea buckthorn fruit with sterile water and adding the washed sea buckthorn fruit into a tissue masher to prepare homogenate, then adding the homogenate into a fermenter that has been sterilized at high temperature, and adjusting a ratio of material to water to 10%, adding dry yeast with a mass of 0.15% of the sea buckthorn fruit and *Lactobacillus casei* with a mass of 0.5% of the sea buckthorn fruit, and stirring evenly; then paling the fermenter in a constant temperature incubator at 37 degrees Celsius (° C.) for fermentation, then obtaining sea buckthorn ferment powder after fermentation of 48-72 hours (h) respectively by oven-drying or freeze-drying.

The preparation solution of sea buckthorn ferment powder obtained by this embodiment contains 800±100 milligrams per liter (mg/L) of total phenols, 350±50 mg/L of total flavonoids and 550±50 mg/L of tea polyphenols, which is 42.18±10.00% higher than the total phenol content, 41.63±10.00% higher than the total flavonoid content, and 210.32±20.00% higher than the tea polyphenol content in the sea buckthorn preparation solution prepared before fermentation.

Embodiment 3

Figure 4:
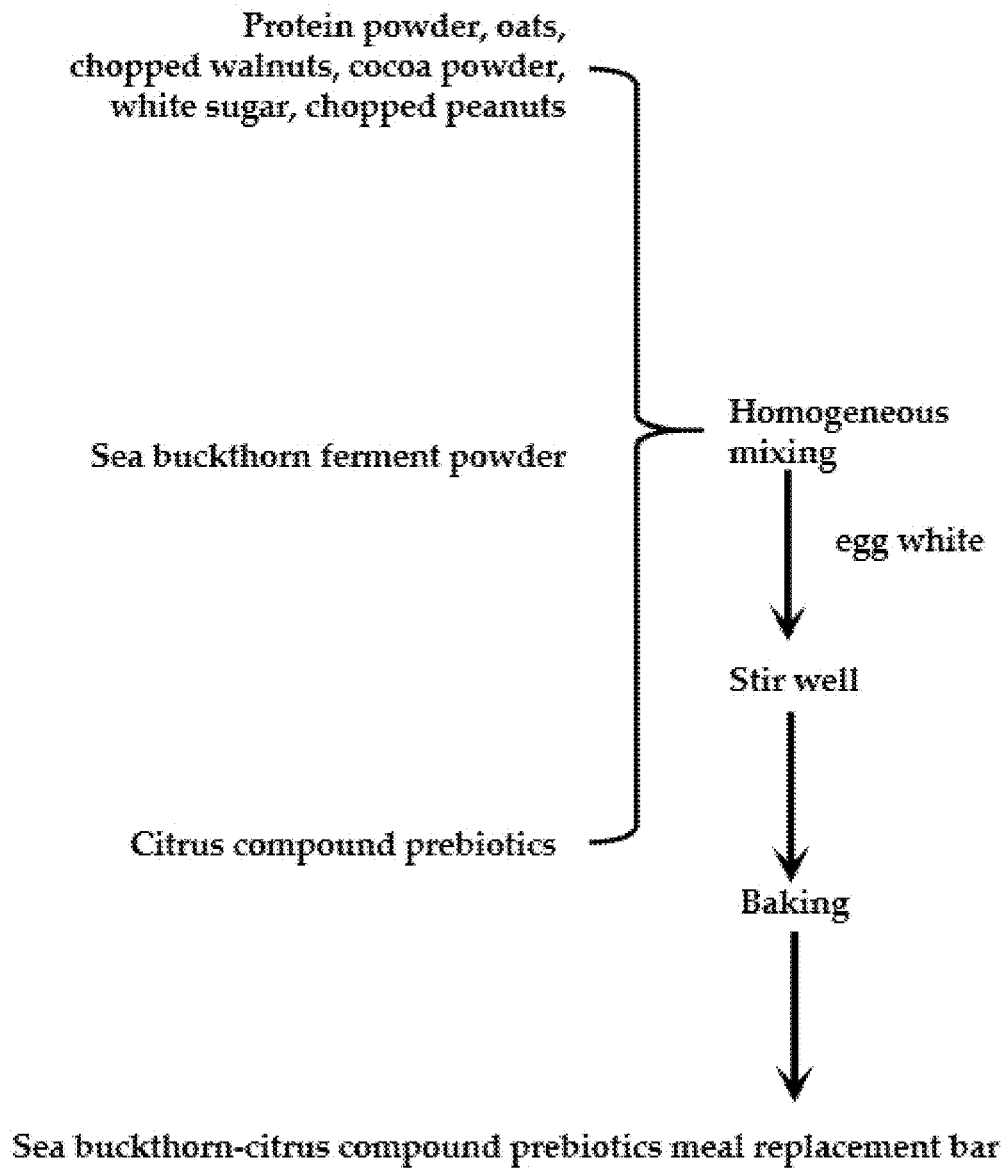
FIG. 4 illustrates a process of a preparation method of a sea buckthorn-citrus compound prebiotics meal replacement bar provided by an embodiment of the present application.

A preparation method of the sea buckthorn-citrus compound prebiotics meal replacement bar includes the following steps as shown in FIG. 4:
stirring protein powder, oats, chopped walnuts, the citrus compound prebiotics prepared in Embodiment 1, cocoa powder, white sugar, chopped peanuts and sea buckthorn ferment powder prepared in Embodiment 2 evenly, then adding egg white and stirring immediately to obtain a primary pulp of the meal replacement bar, then adding the primary pulp into a mold and baking it at 180° C. for 25 minutes (min) to obtain the sea buckthorn-citrus compound prebiotics meal replacement bar.

The optimal additions of sea buckthorn and egg white to the sea buckthorn-citrus compound prebiotics meal replacement bar are initially determined using variable experiments, and the amounts of each ingredient added in each group of experiments are shown in Table 1. After the meal replacement bars are prepared according to the above method, their appearance, taste and texture are evaluated, with results illustrated in Table 2.

TABLE 1

| Groups | Protein powder/g | Oats/g | Chopped walnuts/g | Citrus compound prebiotics/g | Egg white/g | Cocoa powder/g | White sugar/g | Chopped peanut/g | Sea buckthorn ferment powder/g |
|---|---|---|---|---|---|---|---|---|---|
| A1 | 5 | 3 | 3 | 1 | 20 | 5 | 5 | 3 | 2 |
| A2 | 5 | 3 | 3 | 1 | 20 | 5 | 5 | 3 | 4 |

TABLE 1-continued

| Groups | Protein powder/g | Oats/g | Chopped walnuts/g | Citrus compound prebiotics/g | Egg white/g | Cocoa powder/g | White sugar/g | Chopped peanut/g | Sea buckthorn ferment powder/g |
|---|---|---|---|---|---|---|---|---|---|
| A3 | 5 | 3 | 3 | 1 | 15 | 5 | 5 | 3 | 4 |
| A4 | 5 | 3 | 3 | 1 | 10 | 5 | 5 | 3 | 4 |
| A5 | 5 | 3 | 3 | 1 | 15 | 5 | 7 | 3 | 4 |

TABLE 2

| Groups | Evaluation results |
|---|---|
| A1 | A lighter taste of sea buckthorn, shaped |
| A2 | Taste of sea buckthorn, shaped with elasticity, moderate sourness and sweetness, best flavor |
| A3 | Taste of sea buckthorn, shaped with a sweet taste, with traces of sugar crystals on the surface after baking |
| A4 | Heavy taste of sea buckthorn, shaped, high sugar content, heavy sweetness, a few sugar crystals on the surface after baking |

TABLE 2-continued

| Groups | Evaluation results |
|---|---|
| A5 | Slightly heavy taste of sea buckthorn, shaped, high sugar content, overly sweet, lots of sugar crystals on the surface after baking |

From Table 1 and Table 2, it can be seen that the taste of sea buckthorn is light when the amount of sea buckthorn ferment powder is added at 2 g or 4.26%; the amount of egg white can be added at 15-20 g, accounting for 35.8-42.6% of the total weight of raw materials; the best amount of egg white to be added is 20 g or 42.6% of the total weight of raw materials; the best amount of white sugar to be added ranges between 10.20%-12.82%, which should not exceed 15.22% of the total weight of raw materials; otherwise the sweetness will be too strong.

Embodiment 4

The optimum addition of citrus compound prebiotics in the sea buckthorn-citrus compound prebiotics meal replacement bar is determined by variable experiments.

The preparation method and ingredients used in preparing the sea buckthorn-citrus compound prebiotics meal replacement bar is the same as those used in Embodiment 3, with the difference from Embodiment 3 being that: the amount of egg white in Embodiment 3 is limited to 20 g, with the total mass remaining unchanged, the protein powder is used as a filler to make up the total mass, and the amount of citrus compound probiotics added is varied, with the addition amounts set at 0.5 g, 1.0 g, 1.5 g and 2.0 g for each of the four treatments, and the raw materials formulated for each treatment are shown in Table 3. It is found that the primary pulp of group B1 and B2 are unable to be shaped by baking, while the pulp of group B3 may be shaped by baking but its bonding is not firm, and only group B4 is shaped properly.

The observation results of the appearance and morphology of sea buckthorn-citrus compound prebiotics meal replacement bars prepared by each group are shown in Table 3.

TABLE 3

| Groups | Protein powder/g | Oats/g | Chopped walnuts/g | Citrus compound prebiotics/g | Egg white/g | Cocoa powder/g | White sugar/g | Chopped peanut/g | Sea buckthorn ferment powder/g | Evaluation results |
|---|---|---|---|---|---|---|---|---|---|---|
| B1 | 6.5 | 3 | 3 | 0.5 | 20 | 5 | 5 | 3 | 4 | Unshaped |
| B2 | 6 | 3 | 3 | 1 | 20 | 5 | 5 | 3 | 4 | Unshaped |
| B3 | 5.5 | 3 | 3 | 1.5 | 20 | 5 | 5 | 3 | 4 | Shaped but not firmly bonded. |
| B4 | 5 | 3 | 3 | 2 | 20 | 5 | 5 | 3 | 4 | Shaped properly |

As can be seen from Table 3, the optimum amount of citrus compound prebiotics to be added is between 1.5 g and 2 g, with the optimum addition being 2.0 g, or 4.0% of the total weight of the ingredients.

Embodiment 5

The optimum addition of cocoa powder in the sea buckthorn-citrus compound prebiotics meal replacement bar is determined by variable experiments.

The present embodiment adopts the same preparation method and raw materials as preparing the sea buckthorn-citrus compound prebiotics meal replacement bar, with difference from the Embodiment 4 in that: the amount of citrus compound probiotics in Embodiment 4 is limited to 2 g, and the protein powder is used as a filler to make up the total mass while the total mass remains unchanged, and the amount of cocoa powder added is varied to be set at 4 treatments of 2 g, 3 g, 4 g and 5 g, respectively, and the ingredients are formulated for each treatment as shown in Table 4; and the appearance and morphology, taste and texture of the meal replacement bar with sea buckthorn and citrus compound probiotics prepared by each group are evaluated with results as shown in Table 4.

TABLE 4

| Groups | Protein powder/g | Oats/g | Chopped walnuts/g | Citrus compound prebiotics/g | Egg white/g | Cocoa powder/g | White sugar/g | Chopped peanut/g | Sea buckthorn ferment powder/g | Evaluation results |
|---|---|---|---|---|---|---|---|---|---|---|
| C1 | 8 | 3 | 3 | 2 | 20 | 2 | 5 | 3 | 4 | Sensory rating 8, yellowish brown in color and sweet in taste. Suitable moisture and dryness for mixing and stirring before oven-drying |
| C2 | 7 | 3 | 3 | 2 | 20 | 3 | 5 | 3 | 4 | Sensory rating 9.5, brownish in colour, good taste. Suitable moisture and dryness for mixing and stirring before oven-drying. |
| C3 | 6 | 3 | 3 | 2 | 20 | 4 | 5 | 3 | 4 | Sensory rating of 10, with a chocolate colour and best taste. Wet for mixing and stirring before oven-drying. |
| C4 | 5 | 3 | 3 | 2 | 20 | 5 | 5 | 3 | 4 | Sensory rating 9, chocolate colour with a heavy cocoa flavour. Too wet to mix and stir before oven-drying. |

As can be seen from Table 4, the addition of cocoa powder is better at 3 g to 4 g, with the optimum addition being 4 g, or 8% of the total weight of the materials.

Embodiment 6

The optimum addition of sea buckthorn ferment powder in the sea buckthorn-citrus compound prebiotics meal replacement bar is determined by univariate experiment.

The present embodiment adopts the same preparation method and raw materials as preparing the sea buckthorn-citrus compound prebiotics meal replacement bar, with difference from the Embodiment 5 in that: the amount of cocoa powder in Embodiment 5 is defined as 4 g, and the amount of sea buckthorn ferment powder added is varied, with four treatments set at 5 g, 6 g, 7 g and 8 g; the ingredients of each treatment are formulated as shown in Table 5, and the appearance morphology, taste and texture of the prepared sea buckthorn-citrus compound prebiotics meal replacement bars obtained from each group are evaluated, with the results shown in Table 5.

TABLE 5

| Groups | Protein powder/g | Oats/g | Chopped walnuts/g | Citrus compound prebiotics/g | Egg white/g | Cocoa powder/g | White sugar/g | Chopped peanut/g | Sea buckthorn ferment powder/g | Evaluation results |
|---|---|---|---|---|---|---|---|---|---|---|
| D1 | 5 | 3 | 3 | 2 | 20 | 4 | 5 | 3 | 5 | Shaped, taste rating 9.5. |
| D2 | 5 | 3 | 3 | 2 | 20 | 4 | 5 | 3 | 6 | Shaped, taste rating 9.5. |
| D3 | 5 | 3 | 3 | 2 | 20 | 4 | 5 | 3 | 7 | Unshaped, slightly acidic. Taste rating 8. |
| D4 | 5 | 3 | 3 | 2 | 20 | 4 | 5 | 3 | 8 | Unshaped, slightly acidic. Taste rating 7.5. |

From Table 4 and Table 5, it can be seen that it is better to add 4-6 g of sea buckthorn ferment powder, and the best addition amount is 4 g, which is 8% of the total weight of raw materials.

Figure 1:
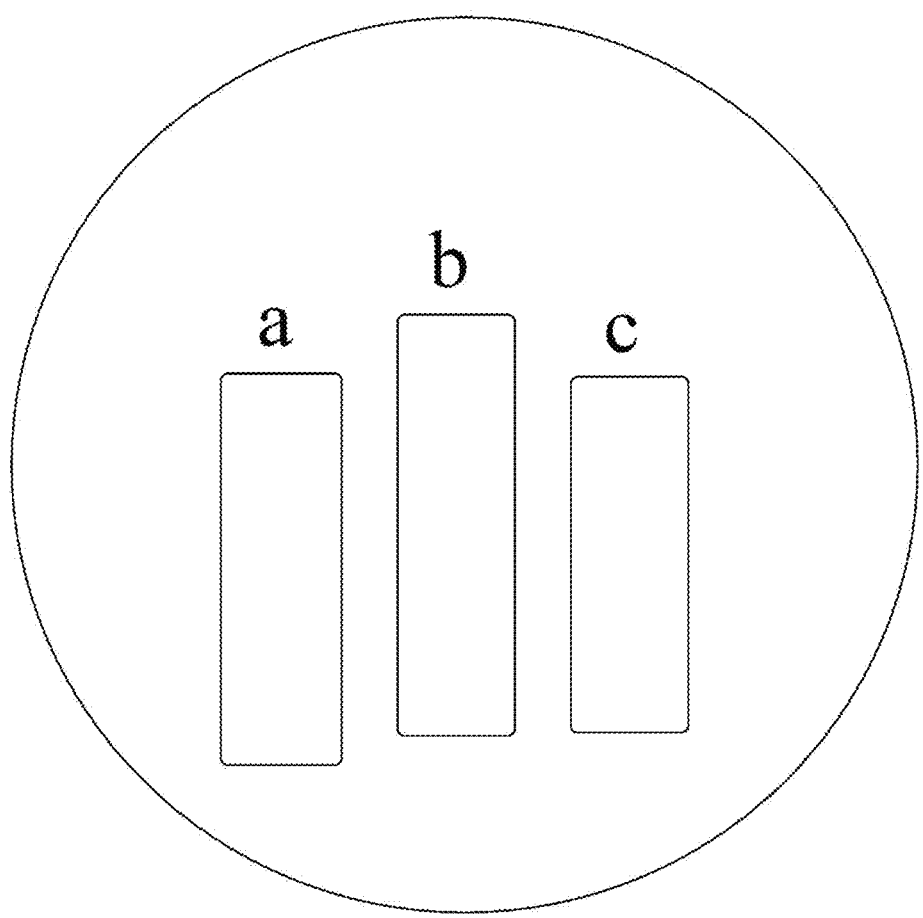
FIG. 1 shows pictures of sea buckthorn-citrus compound probiotic meal replacement bars prepared in groups D2 and D1 of Embodiment 6 and group C3 of Embodiment 5, in an order of a to c.

The physical picture of the sea buckthorn-citrus compound prebiotics meal replacement bars prepared in Group D2 and Group D1 of Embodiment 6 and Group C3 of Embodiment 5 are shown in FIG. 1 from a to c respectively.

Comparative Embodiment 2

The preparation of the meal replacement bar follows the same steps as in Embodiment 3, with the ingredients and dosage as follows: 12 g protein powder, 3 g oats, 3 g chopped walnuts, 20 g egg white, 4 g cocoa powder, 5 g white sugar, and 3 g chopped peanuts.

1. Effect Verification

To verify the consumption effectiveness of the meal replacement bar prepared in Group C3 of Embodiment 5 and the meal replacement bar prepared in Comparative embodiment 2, a total of 20 test subjects aged 26-44 years with normal blood sugar are randomly and equally divided into Group A and Group B; meanwhile, a total of 20 test subjects aged 37-54 years with low glucose tolerance are randomly and equally divided into Group C and Group D. Group A and Group B are served with the meal replacement bar prepared by Group C3 and the meal replacement bar prepared by Comparative embodiment 2 in the amount of 50 g on an empty stomach, while Group C and Group D are served with the meal replacement bar prepared by Group C3 and the meal replacement bar prepared by Comparative embodiment 2 in the amount of 50 g on an empty stomach. The blood glucose values of each group are measured on an empty stomach (i.e. before consumption) and at 30 min and 120 min after consumption, and the results are shown in Table 6.

TABLE 6

| Groups | Blood glucose level before consumption mmol/L. | 30 min blood glucose value mmol/L | 120 min blood glucose value mmol/L |
|---|---|---|---|
| Group A | 5.20 ± 1.00 | 6.00 ± 1.02* | 5.50 ± 0.86 |
| Group B | 5.10 ± 1.30 | 7.80 ± 1.00 | 5.88 ± 0.60 |
| Group C | 6.56 ± 0.58 | 7.38 ± 0.72* | 6.68 ± 0.42* |
| Group D | 6.60 ± 0.62 | 9.40 ± 1.28 | 8.45 ± 1.20 |

As can be seen from Table 6, there is no statistical difference between the fasting blood glucose values of the two groups in the people of normal blood glucose, while there is a significant difference between the blood glucose after 30 min of intake of the sea buckthorn-citrus compound prebiotics meal replacement bar relative to the blood glucose of the control sample, indicating that the sea buckthorn and citrus meal replacement stick slows down the rise of blood glucose in the group of people with normal blood glucose; after 120 min, the blood glucose measured on both occasions has largely recovered; there is no statistically significant difference in fasting blood glucose between the two groups in the people with impaired glucose tolerance, while there is a significant difference in blood glucose 30 min after the intake of the control sample relative to that of the intake of the sea buckthorn-citrus compound prebiotics meal replacement bar, indicating that the sea buckthorn-citrus compound prebiotics meal replacement bar does not contribute too much to the blood glucose increase in the people with impaired glucose tolerance;

2. Storage Duration Verification

The sea buckthorn-citrus compound prebiotics meal replacement bar prepared by the best group is stored at 36° C. for 180 days, with a normal and unchanged appearance, and the contents of total phenols, total flavonoids and tea polyphenols are measured and the results are basically consistent with the initial values. The synergy between citrus compound prebiotics and sea buckthorn ferment ensures the shelf life of the meal replacement bar at room temperature, with no significant decrease in the relevant physiological active ingredients.

The above describes only the preferred embodiments of the present application, the scope of protection of the present application is not limited thereto, and any equivalent substitution or change made by any person skilled in the art in accordance with the technical schemes of the present application and its inventive concept within the technical scope disclosed herein shall be covered by the scope of protection of the present application.

What is claimed is:

1. A preparation method of a sea buckthorn-citrus compound prebiotics meal replacement bar, the preparation method comprising: mixing protein powder, oats, chopped walnuts, citrus compound prebiotics, cocoa powder, white sugar, chopped peanuts and sea buckthorn ferment powder, adding egg white, immediately stirring to obtain a meal replacement bar primary pulp, and baking to obtain the sea buckthorn-citrus compound prebiotics meal replacement bar, wherein the citrus compound prebiotics are prepared by a method as follows: using citrus canning processing alkaline water as a material, filtering and adjusting a pH value to 5-7, then performing ultrafiltering to obtain a first concentrated solution of pectin polysaccharide, followed by alcohol precipitation using 60% ethanol, oven-drying at 45 degrees Celsius and pulverizing to obtain a first product; using citrus canning processing acidic water as a material, adjusting a pH value to 3.5-7, performing filtering then ultrafiltering to obtain a second concentrated solution of pectin polysaccharide, followed by alcohol precipitation using 60% ethanol, drying at 45 degrees Celsius and pulverizing to obtain a second product; and mixing the first product and the second product according to a mass ratio of 1:1 to obtain the citrus compound prebiotics.

2. The preparation method according to claim 1, wherein the baking is carried out under a temperature of 170-190 degrees Celsius for a duration of 20-30 minutes.

3. The preparation method according to claim 1, wherein the sea buckthorn ferment powder is prepared by a method as follows: preparing sea buckthorn fruit into pulp, then adding yeast and *Lactobacillus casei* for fermentation so as to obtain a fermentation product, and drying and crushing the fermentation product to obtain the sea buckthorn ferment powder.

4. The preparation method according to claim 3, wherein a feed-water ratio is adjusted to 1:1, and a sugar content is adjusted to 10% before the fermentation.

5. The preparation method according to claim 3, wherein the yeast is added in an amount of 0.1-0.2% of a mass of the sea buckthorn fruit.

6. The preparation method according to claim 3, wherein the *Lactobacillus casei* is added in an amount of 0.4-0.6% of a mass of the sea buckthorn fruit.

7. The preparation method according to claim 3, wherein the fermentation is carried out under a temperature of 35-40 degrees Celsius for a duration of 12-48 hours.

8. A sea buckthorn-citrus compound prebiotics meal replacement bar prepared by the preparation method according to claim 1, the sea buckthorn-citrus compound prebiotics meal replacement bar comprising raw materials in parts by weight as follows: 5 parts of the protein powder, 3 parts of the oats, 3 parts of the chopped walnuts, 1.5-2 parts of the citrus compound prebiotics, 3-4 parts of the cocoa powder, 4-6 parts of the sea buckthorn ferment powder, 5 parts of the white sugar, 3 parts of the chopped peanuts and 15-20 parts of the egg white.

9. The sea buckthorn-citrus compound prebiotics meal replacement bar according to claim 8, wherein the raw materials comprises, in parts by weight, the 5 parts of the protein powder, the 3 parts of the oats, the 3 parts of the chopped walnuts, 2 parts of the citrus compound prebiotics, 4 parts of the cocoa powder, 4 parts of the sea buckthorn ferment powder, the 5 parts of the white sugar, the 3 parts of the chopped peanuts and 20 parts of the egg white.

* * * * *